Patented Aug. 21, 1934                                                                                1,971,167

UNITED STATES PATENT OFFICE 1,971,167

TREATMENT OF HYDROCARBON OILS

Mayfield C. Sumpter, Chicago, Ill., assignor to Universal Oil Products Company, Chicago, Ill., a corporation of South Dakota No Drawing. Application December 28, 1931,
Serial No. 583,605

6 Claims. (Cl. 196—35)

This invention relates to the treatment of hydrocarbon oils, and refers more particularly to the refining of hydrocarbon oil mixtures to improve their color and odor and to remove objectionable substances such as gums and sulphur compounds.

Treating processes have been developed which involve the use of metallic chlorides such as those of iron, aluminum, zinc, etcetera, as chemical or catalytic reagents either to cause polymerization of unstable unsaturated compounds or to assist in conversion reactions resulting in the formation of increased yields of lower boiling fractions with concurrent elimination of sulfur as hydrogen sulfide. The present invention is concerned with improvements in processes of this type.

In one specific embodiment the invention comprises the treatment of hydrocarbon oil distillates, particularly cracked hydrocarbon oil distillates, with double salts containing aluminum chloride and chlorides of other metals.

It is well known that aluminum chloride exerts a vigorous action upon hydrocarbon oil mixtures, particularly at temperatures above atmospheric. In all cases the treatment with aluminum chloride is limited by the fact that the chloride has a tendency to volatilize and that treating and distilling operations are not entirely independent. Also, that excess coke and sludge may be formed owing to the extreme reactivity of the aluminum chloride. To assist in controlling both the reactivity and the volatility of aluminum chloride in oil treatments, and also to effect improved treating results, the use of double salts of aluminum and other chlorides according to the present invention has been found effective.

The following tabulation shows some of the salts which may be used. These compounds have been established as definite double salts and not eutectic mixtures, although where the latter exist their use has been contemplated:

Aluminum chloride and lithium chloride

| | | |
|---|---|---|
| % LiCl, mols | 43.2 | 47.4 |
| Freezing point °C | 117 | 139.9 |
| Solid phase | AlCl$_3$.LiCl | |

Aluminum chloride and sodium chloride

| | | | | |
|---|---|---|---|---|
| % NaCl, mols | 41.1 | 47.6 | 22.1 | 26.1 |
| Freezing point °C | 123.6 | 147.9 | 190 | 182 |
| Solid phase | AlCl$_3$.NaCl | | $x$AlCl$_2$.$y$NaCl | |

Aluminum chloride and potassium chloride

| | | | | | | | |
|---|---|---|---|---|---|---|---|
| % KCl, mols | 23.0 | 27.0 | 31.2 | 34.5 | 37.5 | 42.9 | 48.8 |
| Freezing point °C | 187.4 | 177.2 | 162.1 | 158.4 | 178.7 | 213.1 | 248.4 |
| Solid phase | $x$AlCl$_3$.$y$KCl | | | AlCl$_3$.KCl | | | |

Aluminum chloride and ammonium chloride

| | | | | | | |
|---|---|---|---|---|---|---|
| % NH$_4$Cl, mols | 23.8 | 31.9 | 33.2 | 36.9 | 38.2 | 43.5 |
| Freezing point °C | 186.6 | 157.9 | 173.4 | 229.4 | 239.7 | 274.1 |
| Solid phase | $x$AlCl$_3$.$y$NH$_4$Cl | | AlCl$_3$.NH$_4$Cl | | | |

| | | | |
|---|---|---|---|
| % NH$_4$Cl, mols | 49.1 | 53.1 | 56.8 |
| Freezing point °C | 301.2 | 287.2 | 266.1 |
| Solid phase | AlCl$_3$.NH$_4$Cl | | |

Aluminum chloride and cuprous chloride

| | | | | | |
|---|---|---|---|---|---|
| % CuCl, mols | 32.2 | 40.6 | 47.9 | 50.9 | 51.0 |
| Freezing point °C | 178.3 | 209.9 | 230.9 | 231.9 | 225.9 |
| Solid phase | | AlCl$_3$.CuCl | | | |

Aluminum chloride and barium chloride

| | | |
|---|---|---|
| % BaCl$_2$, mols | 22.8 | 27.1 |
| Freezing point °C | 209.4 | 255.5 |
| Solid phase | 2AlCl$_3$.BaCl$_2$ | |

Aluminum chloride and magnesium chloride

| | | | | |
|---|---|---|---|---|
| % MgCl$_2$, mols | 17.9 | 22.1 | 27.5 | 29.1 |
| Freezing point °C | 188.0 | 207.6 | 224.2 | 227.4 |
| Solid phase | 2AlCl$_3$.MgCl | | | |

Aluminum chloride and stannous chloride

| | | | | | | | |
|---|---|---|---|---|---|---|---|
| % SnCl$_2$, mols | 22.1 | 28.5 | 33.5 | 38.8 | 48.5 | 50.7 | 63.5 | 69.8 |
| Freezing point °C | 187.0 | 204.4 | 209.1 | 195.0 | 158.7 | 158.2 | 142.3 | 135.4 |
| | 2AlCl$_3$.SnCl$_2$ | | | | AlCl$_3$.SnCl$_2$ | | | |

An inspection of the melting points of these salts will show that by the selection of particular salts treatments may be conducted upon hydrocarbon oil distillates with the salts either in a finely divided solid condition or as liquids emulsified with the oils. Furthermore, double salts may be chosen which are considerably less volatile than aluminum chloride so that a minimum of difficulty is experienced in the vaporization of reagent. The most striking feature of treatments with such double salts as compared to treatments with aluminum chloride alone lies in the fact that a lesser degree of reagent is lost due to the liberation of hydrochloric acid and the fixation of aluminum chloride. This point is of special value in connection with the treatment of light distillates such as cracked hydrocarbon distillates in that chlorination even of highly unsaturated cracked distillates such as are produced in high temperature cracking processes is practically negligible, whereas in treating such distillates with aluminum chloride alone the amount of combined chlorine occurring in the finished gasoline frequently renders it unfit for use as motor fuel on account of its corrosive tendencies.

The invention is not limited to the use of any particular treating apparatus, the particular type employed being determined by the nature of the distillate as regards chemical characteristics and volatility, by the amount of refining treatment necessary to produce the gasoline desired and by the characteristics of the double salt which produces the best treating effect considering all factors. In some cases treatment may be conducted by merely refluxing the oil with a double salt as a batch operation, this being followed by subsequent separation of spent reagent and sludge and redistillation of the treated oil. In other cases the treatment may be made continuous by injecting molten salts into a stream of oil, the reaction products being settled and removed in a manner similar to the use of sulfuric acid in the continuous type of treating plant employed in petroleum refineries.

In some cases the best treatments may be obtained by flowing the fused double salts downwardly concurrent to vapors of the oil to be treated in filled or baffled treating towers, such treatments resulting in marked economy in eliminating the necessity for condensation and rerunning of the treated vapors.

Among the many examples which might be cited of results obtainable by treatments according to the process of the invention a few will suffice to show its advantages.

As one case, treatment of a Mid-Continent cracked gasoline in vapor phase by a molten salt of a molecular composition equal to 40.6% cuprous chloride and 59.4% aluminum chloride may be cited. It will be observed by reference to the table that such a salt has a melting point of 210° C. (or 410° F.), so that its use is possible in a final fractionator operating under 100 pounds pressure where the temperature of the exit vapors is 415° F. By flowing such a salt downwardly over baffling material counterflow to the ascending gasoline vapors a treatment may be effected which produces a stable and low sulfur finished gasoline, requiring little or no further treatment to bring it to a marketable condition. The following tabulation shows the properties of the gasoline which may be produced without vapor phase treatment compared with those produced by the treatment described using approximately six pounds of the double salt per barrel of condensed gasoline:

|  | Untreated | Treated |
|---|---|---|
| Gravity, °A. P. I. | 54.8 | 55 |
| End point °F. | 406 | 409 |
| Color, Saybolt | 8 | 30 |
| Color after 4 hours exposure to sunlight |  | 25 |
| Gums by copper dish | 405 mgs. | 20 mgs. |
| Sulfur | 0.3% | 0.12% |

As an example of a relatively light treatment upon gasoline in the liquid phase, a California cracked gasoline may be continuously treated under elevated temperatures and pressures with a double salt containing 50.7 mol. percent of stannous chloride and 49.3% of aluminum chloride, this salt having a melting point of 158° C. or 315° F. The treatment may be conducted at a temperature slightly above the melting point of the double salt and under a pressure of 100 to 150 pounds to maintain the gasoline in substantially liquid phase and the treatment carried out in a treating plant consisting of the usual alternate mixer and settler arrangement in series. By using an amount of the double salt amounting to approximately five pounds per barrel of gasoline treated, the properties of the gasoline after separation of sludge, neutralizing and distilling may be compared with the raw gasoline treated by reference to the following tabulation of corresponding properties:

|  | Untreated | Treated |
|---|---|---|
| Gravity °A. P. I. | 53.1 | 53.5 |
| End point | 425° F. | 424° F. |
| Color, Saybolt | 6 | plus 30 |
| Color after 4 hours exposure to sunlight |  | 25 |
| Gums, copper dish | 550 mgs. | 30 mgs. |
| Sulfur | .42% | .15% |

The foregoing specification and examples have served to define the scope of the invention and make its advantages apparent to those skilled in the art to which it pertains but it will be evident that the character of the invention is such that it is not limited to the specific examples cited since many other salts may be employed in treatments on varying types of hydrocarbon distillates with advantageous treating effects. Therefore, the specific examples are not to be construed as constituting limitations upon the broad scope of the invention.

I claim as my invention:

1. A process for the refining of hydrocarbon oils, which comprises subjecting such hydrocarbons while in heated vaporous condition to the action of a double salt of aluminum chloride and a chloride of another metal in molecularly equivalent proportions.

2. A process for the refining of hydrocarbon oils, which comprises subjecting such hydrocarbons while in heated vaporous condition to the action of a double salt of aluminum chloride and zinc chloride in molecularly equivalent proportions.

3. A process for the refining of hydrocarbon oils, while in heated vaporous condition, which comprises subjecting the hydrocarbons to reaction with a molten salt mixture containing aluminum chloride and a chloride of another metal in molecularly equivalent proportions.

4. A process for the refining of hydrocarbon oils, while in heated vaporous condition, which comprises subjecting the hydrocarbons to reaction with a molten salt mixture containing aluminum chloride and a chloride of copper.

5. A process for refining hydrocarbon oil which comprises subjecting the oil to the action of a double salt of aluminum chloride and a chloride of another metal in molecularly equivalent proportions.

6. A process for refining hydrocarbon oil which comprises subjecting the oil to the action of a molten salt mixture containing aluminum chloride and a chloride of another metal in molecularly equivalent proportions.

MAYFIELD C. SUMPTER.